United States Patent [19]

Niksic

[11] Patent Number: 5,069,572
[45] Date of Patent: Dec. 3, 1991

[54] NUB ASSEMBLY FOR TENT FRAME STRUTS

[75] Inventor: Mark R. Niksic, Lakewood, Colo.

[73] Assignee: T. A. Pelsue Company, Englewood, Colo.

[21] Appl. No.: 461,921

[22] Filed: Jan. 8, 1990

[51] Int. Cl.$^5$ .............................................. F16B 7/04
[52] U.S. Cl. .................................... 403/170; 403/218; 135/109
[58] Field of Search ............... 403/170, 171, 174, 176, 403/217, 218, 56, 114, 115, 141; 135/104, 102, 106, 109, 98

[56] References Cited

U.S. PATENT DOCUMENTS

| 2,856,816 | 10/1958 | Ross | 403/56 X |
| 3,766,932 | 10/1973 | Sidis et al. | 135/109 |
| 4,480,418 | 11/1984 | Ventrella | 403/176 X |
| 4,606,669 | 8/1986 | DeBliquy | 403/170 |
| 4,637,748 | 1/1987 | Beavers | 135/109 X |
| 4,750,509 | 6/1988 | Kim | 135/102 |

FOREIGN PATENT DOCUMENTS 2075589 11/1981 United Kingdom ................ 403/114

Primary Examiner—Peter M. Cuomo
Attorney, Agent, or Firm—Rothgerber, Appel, Powers & Johnson

[57] ABSTRACT

A hub for providing an articulating interconnection between the ends of tent frame struts, comprising a base member and a cap member rotatably interconnected by a common axis of rotation to form an encasement having a plurality of interior cavities equally spaced radially from the common axis, a like plurality of elongated windows each having top and side framing portions and a sill, each in communication with one of the cavities, a like plurality of radial slots in the base member in respective communication with one of the said windows and a like plurality of sockets, each having a spherical terminating end portion and disposed in each of said cavities.

5 Claims, 3 Drawing Sheets

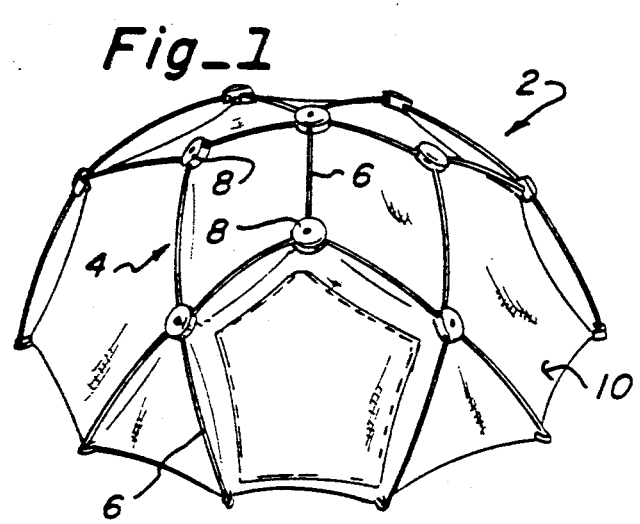
Fig_1
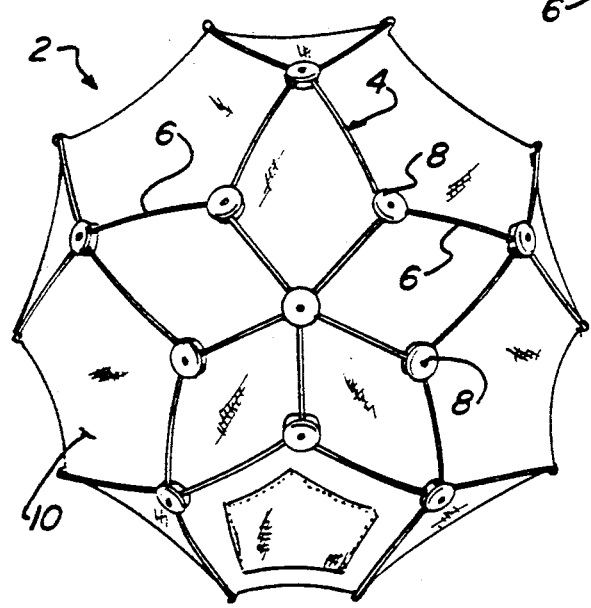
Fig_2
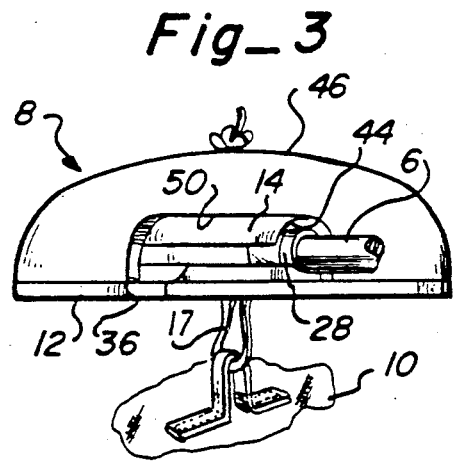
Fig_3
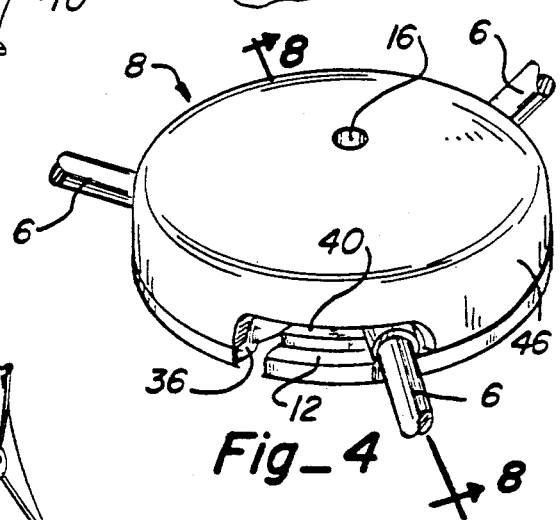
Fig_4
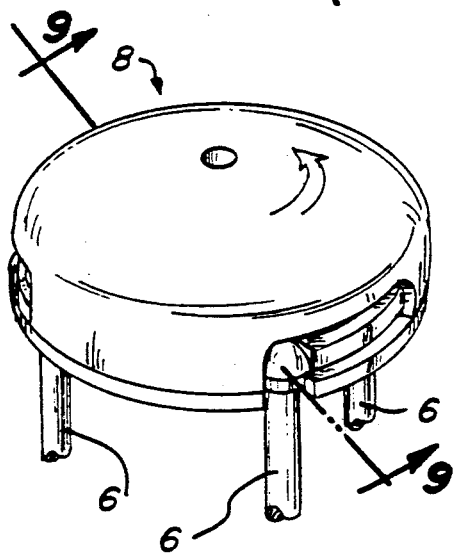
Fig_5

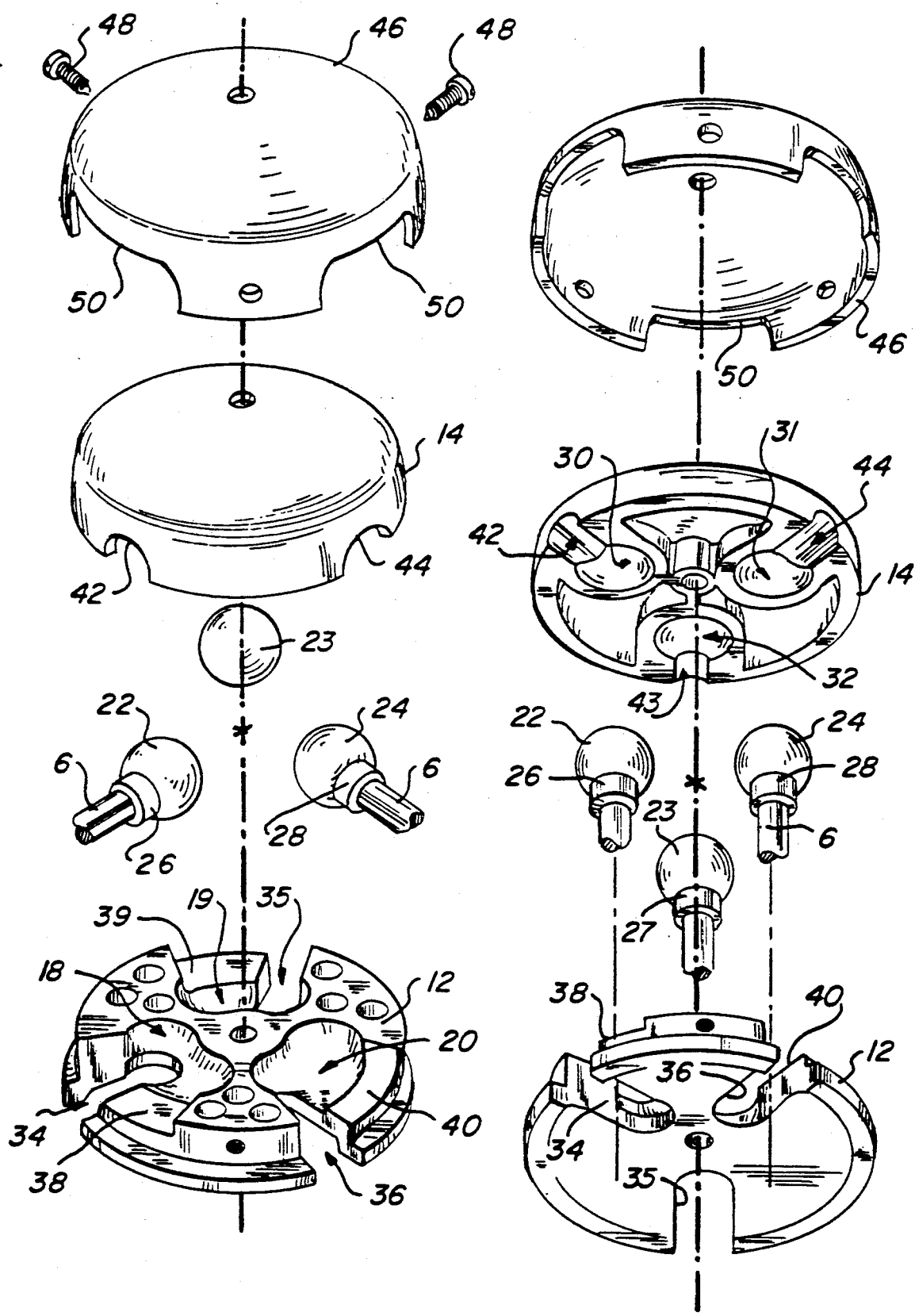

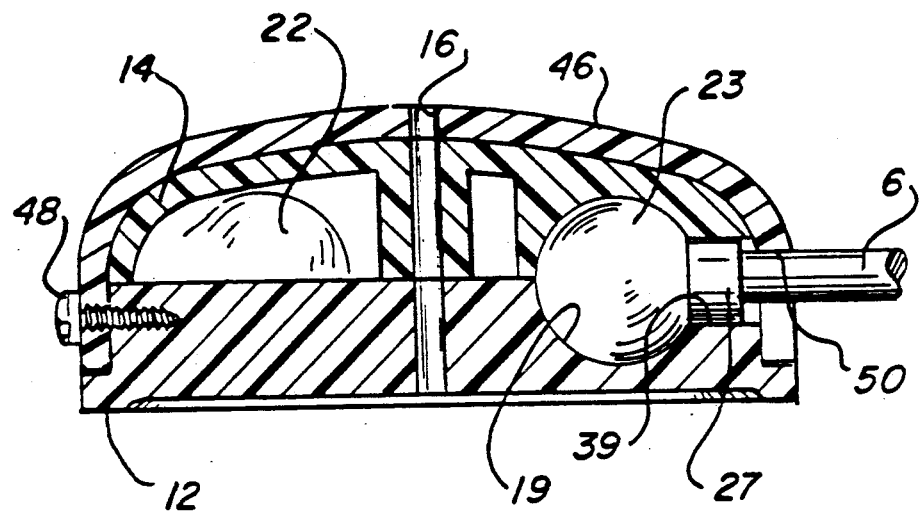
Fig_8
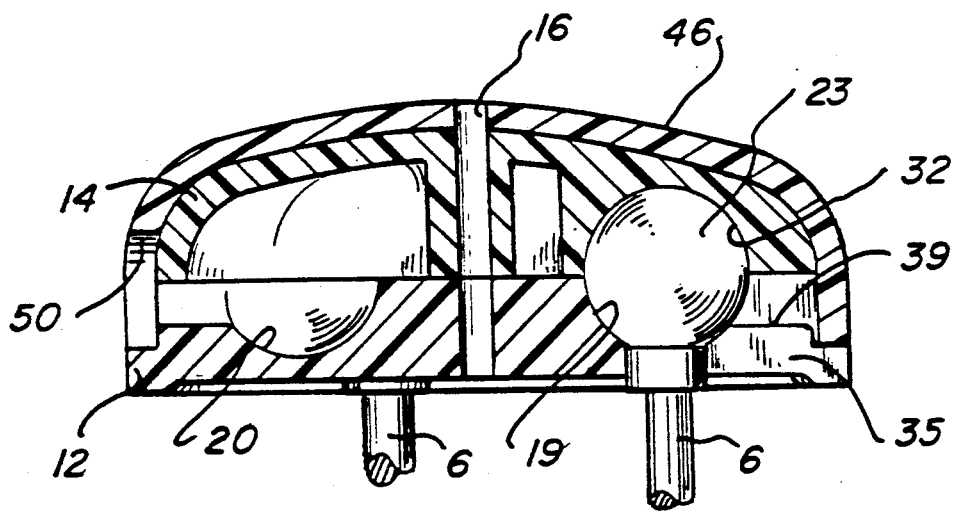
Fig_9

NUB ASSEMBLY FOR TENT FRAME STRUTS

The present invention relates generally to the construction of improved hub members for use in interconnecting the flexible struts used to form the framework of a tent of the type shown in U.S. Pat. No. 4,077,417 and more specifically of described in co-pending U.S. patent application Ser. No. 07/406,233, filed Sept. 12, 1989, entitled Geodetic Tent Structure, now U.S. Pat. No. 4,998,552.

BACKGROUND OF THE INVENTION

The prior art has seen many disclosures of hub assemblies for interconnecting the struts or rib members of tents frames. These hubs have taken different forms, depending on the concept of the tent frame assembly, but the most pertinent type of hubs contain a mounting base or platform to which are secured a plurality of pivotal sockets which receive the ends of the respective struts. Representative of such hub construction are U.S. Pat. Nos. 3,766,932, 4,637,748 and 4,750,509.

The primary object of the improvement defined by the hubs of the present invention is to provide a device for interconnecting the struts of a collapsible tent frame in a manner that will sustain and carry them in bowed compression in the tent erected state and will allow the struts, for purposes of collapsing the tent frame, to be pivotally rotated about the center of the hub in the same direction as that of the force on the struts when they are under compression.

A second object of the invention is to provide a hub of the type described which can be alternated between a compression resisting erect tent frame condition and a folded collapsed frame condition with a simple rotation of one hub component with respect to another.

A still further object of the invention is to provide a hub having sockets for retaining the tent frame strut members which sockets are rotatable about all axes, including the longitudinal axis of the struts in order to relieve twisting or torsional forces in the struts.

Another object of the invention is to provide a hub construction which will fulfill the need in collapsible tent frames for a hub which is collapsible in the same direction as that of the forces which it is required to resist in the erect condition.

Other and further objects, features and advantages of the invention will become apparent from the following description of a preferred form of the invention, taken in connection with the accompanying drawings in which:

FIG. 1 is a perspective view of a geodetic-type tent frame structure in which the hubs of the present invention can be used.

FIG. 2 is a top view of the tent frame structure shown in FIG. 1.

FIG. 3 is a side elevational view of the hub of the present invention showing a flexible cord for purposes of attaching the tent skin to the hub. The single frame strut which is shown is only fragmentary with a portion thereof shown in cross-section.

FIG. 4 is an elevated perspective view of the hub shown in FIG. 3 with the tent framing struts fragmentarily shown as they would be seen in the erected tent frame of FIGS. 1 and 2.

FIG. 5 is an elevated perspective view of the hub with the tent framing struts fragmentarily shown in their collapsible position.

FIG. 6 is a downward directed exploded perspective view of the hub and fragmentary struts as they are shown in FIG. 4.

FIG. 7 is an upward direction exploded perspective view of the hub and fragmentary struts as they are shown in FIG. 5.

FIG. 8 is a cross-sectional view taken along lines 8—8 of FIG. 4.

FIG. 9 is a cross-sectional view taken along lines 9—9 of FIG. 5.

SUMMARY OF THE INVENTION

The preferred form of the invention comprises a generally circular patty-shaped socket-encasing sandwich formed of a base and a cap member. The base and the cap are rotatable with respect to each other about a common central axis. The encased sockets receive and hold the ends of tent frame struts and are rotatable about an axis lying in the plane of the hub; however, that rotation is restricted to an arc of approximately ninety degrees where one side of that arc is a line lying in the plane of the hub body (tent frame erect position) and the other side of the arc is a line parallel to the common axis of rotation between the base and cap members (tent frame collapsed position). A slot is provided in the base member to allow the rotation of the sockets and their retained struts to the position of being parallel to the axis of rotation of the common axis of rotation between the base and the cap members (hereinafter referred to as "vertical rotation").

Because the sockets are distally spherical in shape the struts which are retained by the sockets are also rotatable about an axis of rotation which is parallel to the common axis of rotation between the base and the cap, that is the struts can rotate arcuately in the primary plane of the hub body. In addition to this arcuate rotation the socket spheres are arcuately slidable within the confines of the recesses in the base member. The combination of sliding movement within the base member recesses and the arcuate rotation, however, is restricted to a rather small arc angle by the sides of a window formed in the encasement structure through which the struts extend.

When the struts being retained by the hub are inserted in their respective sockets and the sockets are rotated vertically to position the struts into the same plane as the primary plane of the hub, that is the hub is representative of the center of a circle having radii represented by the struts, the struts are then rotatable and arcuately slidable within the plane of that circle (hereinafter referred to as "horizontal movement") to the extent permitted by the windows. The slots permitting ninety degrees of vertical strut rotation are positioned at one side of each of the windows so that when the struts are horizontally rotated to a position coincident with the slots they are free to rotate vertically through the aforementioned ninety degree arc; however, when the struts are horizontally rotated so as to be positioned laterally into the window and away from the slot, the struts are restricted from vertical rotation by the sills and top edges of the windows. The struts are placed in this latter position when the tent frame is in the erected position so that the hub holds the ends of the struts and resists the bending moments caused by the compression of the struts between the ground and the first level of hubs or between adjacent hubs.

The cap member of the encasement, being rotatable with respect to the base member, acts as a follower or actuator so that when the hub member is held in position and one of the strut members is rotated horizontally, all the strut members will be made to follow the rotation.

DETAILED DESCRIPTION

Referring to the drawings, FIGS. 1 and 2 illustrate what has been referred to a geodetic tent structure 2. The structure includes a frame 4 which is constructed of flexible struts 6 interconnected by hubs 8. Attached to the frame is a flexible skin or covering 10. It is seen that the frame 4 is generally hemispherical in shape, the curvature being created by the outward bowing of the struts which are in compression and which are constrained as an integral unit by the tension in the floor member itself or by the tension forces inherent in the covering 10.

The hub 8 is primarily constructed of two circularly shaped rigid patty halves, that is, a base member 12 and a cap member 14 which are placed together in a sandwich type construction and interconnected by a pivot or pin device inserted in aperture 16, holding the base and cap member together and allowing one to rotate about the axis formed by the pin device with respect to the other. A cord 17 which attaches the tent skin 10 to the hub can serve as the pivot or pin device.

The hub 8 shown in the drawings is one intended for interconnecting three struts, however the hub of this invention can be built to interconnect four or five or even more struts, depending on the size of the hub and the diameter of the struts. In the tri-strut embodiment illustrated the base member 12, which is preferably a flat plate of plastic or metal with parallel upper and lower surfaces, is provided with three concave arcuately elongated recesses 18, 19 and 20. The recesses are each equidistant radially from the center of the base member and the angular separation between the radii on which the center of the recesses lie are equal in the embodiment shown, but do not have to be arcuately equal.

Adapted to be seated in the recesses for rotation therein are three similarly dimensioned ball bearing-like spheres 22, 23 and 24. Each of the spheres are attached to a short tubular members forming strut sockets 26, 27 and 28.

The underside of the cap member 14 is provided with three hemispherical recesses 30, 31 and 32 which are positioned so as to overlie the recesses 18, 19 and 20 so that when the base member and the cap member are fastened together by the pin device pockets are formed to hold each of the respective socket spheres 22–24. The hemispherical recesses 30–32 in the underside of the cap member are sized to accept and seat the spheres with just enough tolerance for their easy rotation. The base member recesses on the other hand are arcuately elongated in order that the spheres may move sideways, that is, in the arc of a circle whose center is the common axis formed by the pin within the aperture 16, when the entrapped spheres 22–24 are urged to move by rotation of the cap member 14 with respect to the base member 12.

To accommodate vertical rotation, that is rotation of the struts about an axis lying within and co-planer with the base member 12, the base member 12 is provided with cut-outs or slots 34, 35 and 36 through which the sockets 26–28 and their respective seated struts 6 may move to assume a position in which the struts are parallel with the extended axis of the pivot pin located in the aperture 16. This is the position which the struts assume when the tent frame is collapsed.

Located in the perimeter of the base member 12 and in communication with the respective recesses are three elongated relieved areas 38, 39 and 40. These recesses work in cooperation with three hemi-cylindrical radially disposed channels 42, 43 and 44 in the underside of the cap 14, which communicate with and are co-axial with the center lines of the hemispherical recesses 30–32 to form three slidable windows where the relieved areas 38–40 form the sills of the windows and the cap recesses 42–44 form the top and sides.

It is apparent from the drawings that when the cap member 14 is rotated to a position where the hemi-cylindrical cap recesses are superimposed directly over the slots 34–36 the struts are free to rotate vertically to the so-called collapsed position, as shown in FIG. 5. However, after the struts are vertically rotated to the position shown in FIG. 6, lying within the primary plane of the hub, the cap member 14 may be rotated with respect to the base member 12, thus forcing the spheres 22–24 sideways within the recesses 18–20 and sliding the window sideways to a position, shown in FIG. 3, where the sills 38–40 restrict vertical rotation of the struts 6. In this position of the window where the struts cannot pivot about the axis which lies in and co-planer with the base member 12, compressive force can be applied to the struts, bending and bowing them outwardly, as described earlier in connection with the description of the tent frame of FIG. 1.

From the foregoing description, it is seen by rotation of the cap member 14 of the hub 8 the struts 6 may be locked into a position where the hub may resist the moments inherent in the compressive forces applied to the struts. By opposite direction rotation of the cap member the window may be positioned to allow the struts to rotate vertically to fall into parallel alignment with the common axis 16 of the hub and permit the tent frame to be collapsed.

An inverted cup-shaped cover 46 is superimposed over the cap member 14 and secured to the base member with screws 48. The cover, among other things, facilitates hand holding of the hub during horizontal movement of the struts which effects rotation of the cap member 14 and consequent horizontal movement of all of the struts 6 which are carried by the hub. The depending lip of the cover is provided with angularly spaced crenals or notches 50 to accommodate the horizontal movement of the struts 6.

I claim:
1. A hub for receiving the ends of tent frame struts, comprising;
   a rigid and generally circularly shaped planer base member having,
   top and bottom surfaces,
   a plurality of radially extending slots through the thickness of the base member,
   a like plurality of arcuately extending recesses disposed in the top surface and communicating with the radial slots, each of said recesses being adjacent, along its circumferentially near side, to an arc of reduced base member thickness;
   a like plurality of spherically shaped socket means disposed in the arcuately extending recesses, each adapted to receive the proximal ends of an elongated strut;
   follower means rotatably attached to the base member, superimposed over the socket means and en- gageable with the proximal end portions of the struts; and cap means nested over the follower means and secured to the base member and having a like plurality of notches along its lip which are circumferentially co-extensive with the width of the said slots and the arc of reduced base member thickness.

2. A hub for providing an articulating interconnection between the ends of tent frame struts, comprising;

a base member and a cap member rotatably interconnected by a common axis of rotation to form encasement means and having, a plurality of interior cavities forming arcuately extending recesses in the base member and equally spaced radially from the common axis, a like plurality of elongated windows each having top and side framing portions and a sill, each in communication with one of the arcuately extending recesses;

a like plurality of radial slots in the base member each in respective communication with one of the said windows; and socket means having a spherical terminating end portion and disposed in each of said arcuately extending recesses.

3. The hub of claim 2 where the sills and sides of the windows are formed from relieved sections of the base member and the top edges of the windows are formed by the cap member.

4. The hub of claim 3 where the cap member has radially disposed relieved channels to accommodate a portion of the socket means.

5. The hub of claim 4 and further including cup shaped cover means having, a lip depending over the encasement means and fixed to the base member and notches in the lip which are positioned to correspond arcuately with the positions of the windows.

* * * * *